Figure 1B:
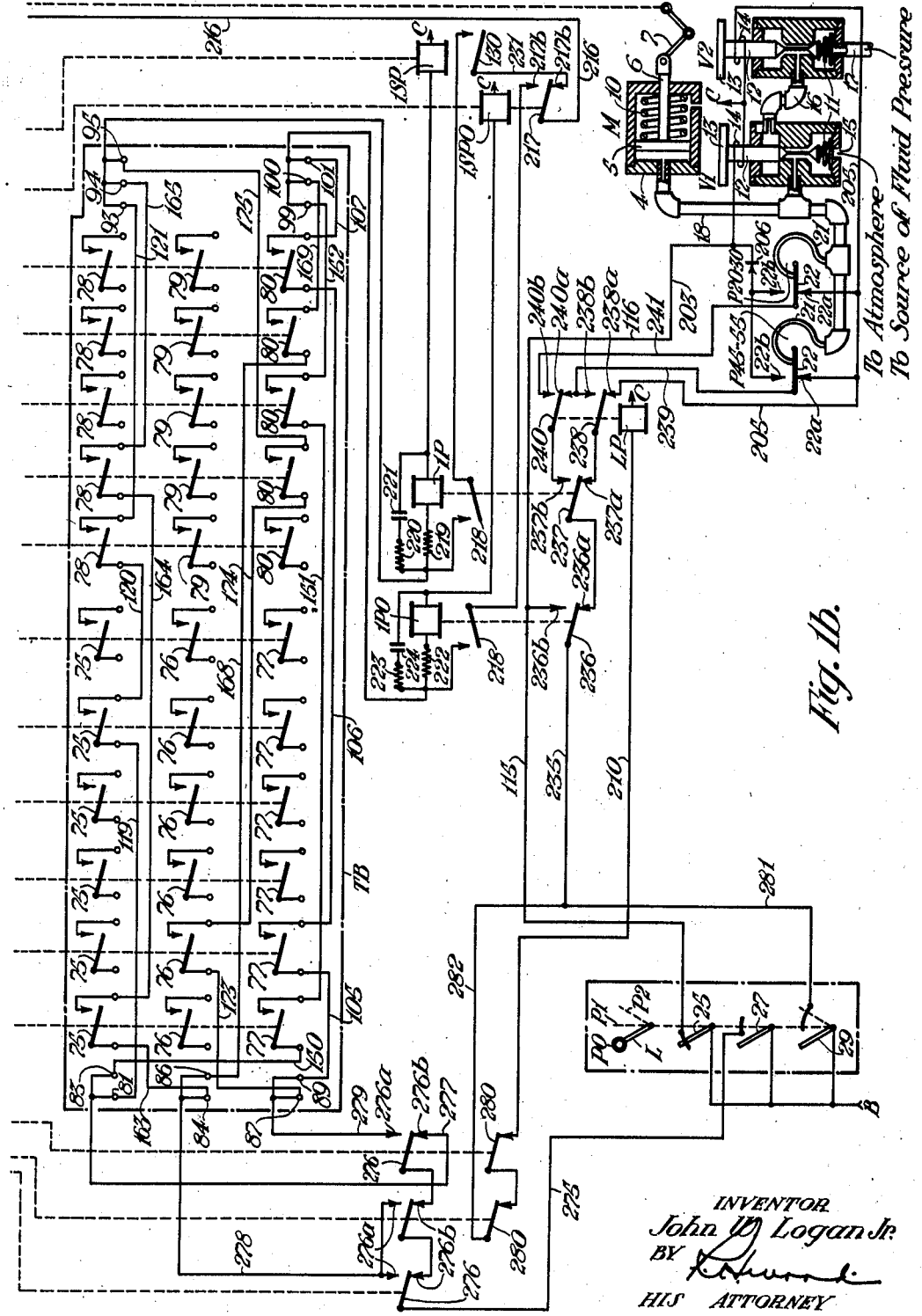

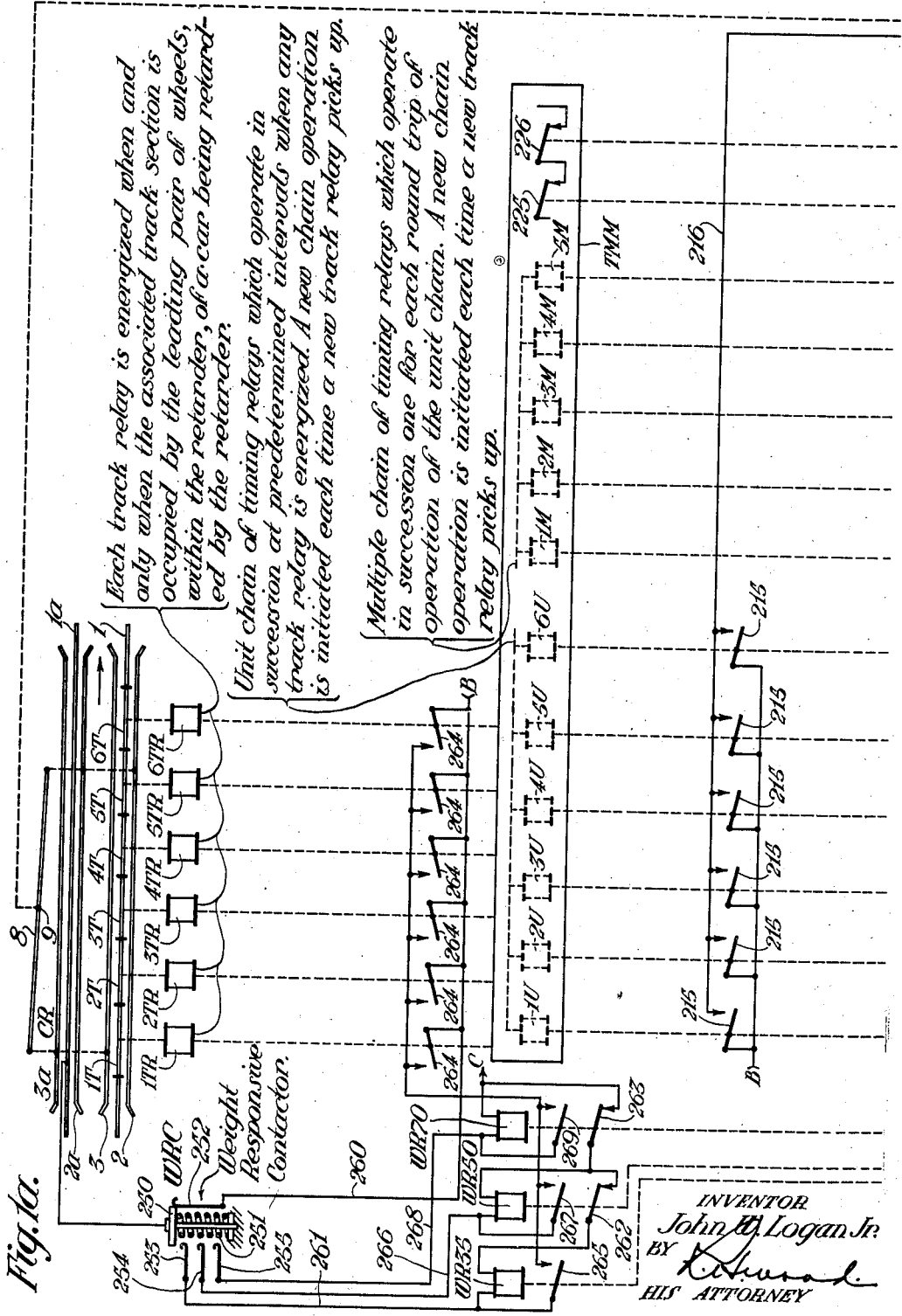

SPEED SELECTING CONNECTIONS

Connect Front Contacts of Relay Combinations shown to obtain speed indicated.

| Relay Combination | Speed in M.P.H. |
|---|---|
| 1M+2U | 16.0 |
| 1M+3U | 14.2 |
| 1M+4U | 12.8 |
| 1M+5U | 11.6 |
| 2M | 10.6 |
| 2M+1U | 9.8 |
| 2M+2U | 9.1 |
| 2M+3U | 8.6 |
| 2M+4U | 8.0 |
| 2M+5U | 7.5 |
| 3M | 7.1 |
| 3M+1U | 6.7 |
| 3M+2U | 6.4 |
| 3M+3U | 6.1 |
| 3M+4U | 5.8 |
| 3M+5U | 5.6 |
| 4M | 5.3 |
| 4M+1U | 5.1 |
| 4M+2U | 4.9 |
| 4M+3U | 4.7 |
| 4M+4U | 4.6 |
| 4M+5U | 4.5 |
| 5M | 4.3 |
| 5M+1U | 4.2 |
| 5M+2U | 4.0 |
| 5M+3U | 3.9 |
| 5M+4U | 3.8 |
| 5M+5U | 3.7 |
| 5M+6U | 3.6 |

Fig. 2.

INVENTOR
John W. Logan Jr.
BY
HIS ATTORNEY

Patented Oct. 5, 1943

2,331,125

UNITED STATES PATENT OFFICE 2,331,125

RAILWAY BRAKING APPARATUS

John W. Logan, Jr., Forest Hills, Pa., assignor to The Union Switch & Signal Company, Swissvale, Pa., a corporation of Pennsylvania Application April 18, 1942, Serial No. 439,582

12 Claims. (Cl. 303—21)

My invention relates to railway braking apparatus, and particularly to car retarders of the type comprising wheel engaging braking bars located beside a track rail and movable toward and away from the rail into braking and non-braking positions. More particularly, my invention relates to apparatus of the type described wherein the braking bars are arranged to be moved to their braking positions by one or more fluid pressure motors and to be restored to their non-braking positions by suitable biasing means.

One object of my invention is the provision of improved means for automatically controlling the braking action of a car retarder of the type described in accordance with the speed and weight of a car passing therethrough.

Another object of my invention is to provide a control system for car retarders of the type described which will cause cars to leave the retarder at a speed which is inversely proportional to the weight of the car, whereby light cars will leave the retarder at a higher speed than heavy cars.

Apparatus embodying my invention is an improvement upon that described and claimed in an application for Letters Patent of the United States, Serial No. 424,338, filed by Clarence S. Snavely, on December 24, 1941, for Railway braking apparatus.

According to my invention, a stretch of track with which the retarder is associated is divided into short track sections of such lengths that two wheels of a car cannot occupy a section at a time, and each track section has associated therewith a track relay which becomes energized when and only when the associated section is occupied by the leading pair of wheels within the retarder of a car being retarded by the retarder. When any track relay is energized, it sets into operation speed responsive means including a unit and multiple chain of counting relays whereby the speed of the car is determined.

The stretch of track with which the retarder is associated also has associated therewith means for selectively operating a plurality of contacts in accordance with the weight of a car entering the retarder, which contacts together with contacts of the track relays control a plurality of weight responsive relays. The control of the weight responsive relays is such that these relays will selectively pick up in accordance with the weight of a car entering the retarder, and when picked up will remain picked up until the car leaves the retarder.

The weight responsive relays and the relays of the unit and multiple chains together control other relays which control the supply of fluid pressure to the car retarder in such manner that the retarder will exert a braking force which is inversely proportional to the weight of the car being retarded, whereby heavy cars will leave the retarder at a relatively low speed and light cars at a relatively high speed. This control is desirable in order to obtain uniform coupling speeds when the cars reach their destination in the classification tracks of a gravity type car retarder yard since the car resistance of light cars is greater than that of heavy cars.

Other objects and characteristic features of my invention will become apparent as the description proceeds.

I shall describe one form of railway braking apparatus embodying my invention, and shall then point out the novel features thereof in claims.

In the accompanying drawings, Figs. 1a and 1b are views which when placed one above the other with Fig. 1a on top in such manner that the dotted lines leading to the bottom of Fig. 1a align with the dotted lines leading to the top of Fig. 1b, together constitute a view partly sectioned and partly diagrammatic illustrating one form of apparatus embodying my invention. Fig. 2 is a table showing the method of connecting the front contacts of certain ones of the relays forming part of the apparatus illustrated in Figs. 1a and 1b to obtain predetermined control speeds.

Similar reference characters refer to similar parts in both views.

Referring first to Figs. 1a and 1b, the reference characters 1 and 1a designate the track rails of a stretch of railway track over which cars normally move in the direction indicated by the arrow under such conditions that it is desirable to at times control the speed of the cars automatically. For example, the stretch of track here shown might be in a classification yard of the hump type through which cars move under the influence of gravity. It is obvious that in service of this kind the speed of individual cars or strings of cars will vary through wide limits depending among other things on the speed at which they go over the hump, the temperature, the weight of the car and its contents, and the condition of the car as to whether it is a free running car or otherwise.

In order to control the speed of the cars, the stretch of track illustrated in the drawings is provided with a car retarder CR which in the form here shown comprises two braking bars 2 and 3 extending parallel with, and located on opposite sides of rail 1, and two similar braking bars 2a and 3a extending parallel with and located on opposite sides of rail 1a.

The braking bars 2, 3, 2a and 3a are operated by a fluid pressure motor M (Fig. 1b) comprising a cylinder 4 containing a reciprocable piston 5 attached to one end of a piston rod 6. The braking bars 2, 3, 2a and 3a are operatively connected with the piston rod 6 through a suitable linkwork here shown as comprising a bell crank 7 and a lever 8 pivotally supported at point 9. When piston 5 occupies its extreme left-hand position, in which it is illustrated in the drawings, the braking bars occupy their non-braking or ineffective positions in which they are out of engagement with the wheels of a car traversing the rails 1 and 1a. When piston 5 is moved to its right-hand position, however, as when fluid pressure is admitted to the left-hand end of cylinder 4, the braking bars 2, 3, 2a and 3a are moved toward the associated rails to their effective or braking positions in which they will engage the wheels of a car traversing the rails 1 and 1a, to retard the speed of the car.

The braking bars 2, 3, 2a and 3a are constantly biased to their non-braking positions by any suitable means, here shown as a spring 10 which is interposed in the cylinder 4 between the right-hand end of the cylinder and the piston 5.

The motor M is controlled by two magnet valves V1 and V2, each comprising a valve stem 12 biased to an upper position by means of a spring 11, and provided with an armature 13 and a winding 14. When valve V1 is energized, as shown in the drawings, valve stem 12 of this valve is moved downwardly against the bias of spring 11, and a pipe 18 which communicates with the left-hand end of motor M is then connected with atmosphere through a port 15. When valve V1 is deenergized, however, pipe 18 is disconnected from atmosphere, and is connected with a pipe 16 leading to valve V2. When valve V2 is energized, valve stem 12 of this valve moves downwardly, and connects pipe 16 with a pipe 17 which is constantly supplied with fluid pressure, usually air, from a suitable source not shown in the drawings, but when valve V2 is deenergized, as shown in the drawings, pipe 16 is then disconnected from pipe 17. It will be apparent, therefore, that when valve V1 is energized, the region of the cylinder 4 of motor M between the piston 5 and the left-hand end of the cylinder is connected with atmosphere, so that the braking bars of the car retarder will then be held in their ineffective or non-braking positions by the spring 10. When, however, valve V1 is deenergized, and valve V2 is energized, fluid pressure will be supplied to the left-hand end of cylinder 4 of motor M, thus causing the braking bars to move to their effective or braking positions. It will be obvious that when the braking bars are moved to their braking positions, they will exert a braking force which is proportional to the pressure of the fluid which is then supplied to the right-hand end of motor M.

The valves V are controlled in part by a plurality of pressure responsive devices P20—30 and P45—55, each comprising a Bourdon tube 21 connected to pipe 18 and hence subjected to the pressure of the fluid in the left-hand end of motor M. Each Bourdon tube controls two contacts 22—22a and 22—22b. The pressure responsive devices P20—30 and P45—55 are so constructed and so adjusted that they will operate successively as the pressure in the region of cylinder 4 between the piston 5 and the left-hand end of the cylinder increases. For example, for all pressures below 20 pounds per square inch, the contact 22—22a of each of these devices is closed. If the pressure exceeds 20 pounds per square inch, however, the contact 22—22a of device P20—30 opens, and if the pressure exceeds 30 pounds per square inch, contact 22—22b of device P20—30 closes. In similar manner, the pressure responsive device P45—55 is adjusted to open its contact 22—22a at 45 pounds per square inch, and to close its contact 22—22b at 55 pounds per square inch. Of course, these specific pressures are not essential but are only mentioned for purposes of explanation.

The valves V are also controlled in part by two relays 1P and 1PO which relays, in turn, are controlled by speed and weight responsive apparatus in a manner which will be described in detail hereinafter.

The valves V are further controlled by means of a manually operable lever L which, as here shown, is capable of assuming three positions, indicated by dotted lines in the drawings, and designated by the reference characters p0, p1 and p2, respectively. Operatively connected with the lever L are a plurality of contacts 25, 27 and 29. Contacts 25 and 27 are closed, respectively, in the p0 and p1 positions of lever L, while contact 29 is closed in the p1 position, the p2 position, or any position intermediate these two positions.

The lever L will usually be located at a point remote from the braking apparatus, as in the control cabin of a classification yard car retarder system, and will be connected with the braking apparatus by means of line wires extending from the control cabin to the braking apparatus.

The valves V are still further controlled in part by a relay LP which provides a means for at times changing the general level of the fluid pressure supplied to the fluid pressure motor M. That is to say, when this relay is deenergized, the pressure responsive devices P20—30 and P45—55 are rendered ineffective to control the valves V, and if the valve V2 is energized under these conditions, motor M will be supplied with fluid at full line pressure. When, however, relay LP is energized, the pressure responsive device P20—30 or P45—55 will then be rendered effective to control the valves V1 and V2, depending upon whether relay 1P is then picked up or released.

The relay LP is controlled in part by the lever L and in part by the weight responsive apparatus, in a manner which I shall describe in detail hereinafter.

The previously mentioned speed responsive apparatus for controlling relays 1P and 1PO comprises a series of relatively short insulated control sections 1T, 2T, 3T, 4T, 5T and 6T, which control sections are formed in the rail 1. These control sections will usually be of uniform lengths, and their lengths may be varied as conditions require, but the lengths of these sections will preferably be such that two wheels of a car cannot occupy the same section at any one time. A preferred length for these sections is 3 ft. 1½ in.

Associated with each control section is a track relay designated by the reference character R with a prefix corresponding to the reference character for the associated section. These track relays are sensitive quick acting relays, and each relay is controlled by suitable track circuits not shown in such manner that each relay will be energized when and only when the associated control section is occupied by the leading pair of wheels within the retarder of a car passing through the retarder. One form of track circuits by means of which the desired control of the track relays may be effected is described and claimed in the aforementioned Snavely application, Serial No. 424,338, and if a full description of this apparatus is desired reference may be had to this application.

The speed responsive apparatus also includes means TMM controlled by the track relays ITR to 6TR for measuring the time required for a car which is being retarded to traverse a distance equal to the lengths of the track sections to thereby provide a measurement of the speed of the car. This means forms no part of my present invention, and may, for example, be similar to that described and claimed in the aforementioned Snavely application, Serial No. 424,338. Assuming that this means is similar in all respects to that shown in the said Snavely application, it is believed to be sufficient for purposes of my present invention to point out that this means includes a unit chain of counting relays IU to 6U which operate in succession at predetermined intervals when any track relay is energized and a multiple chain of counting relays IM to 5M which operate in succession, one for each round trip of operation of the unit chain. A new operation of both chains is initiated each time a new track relay picks up, which new operation necessitates that all of the relays of both chains be initially deenergized. The time interval which elapses between the picking up of successive relays of the unit chain may have any desired value, but for purposes of illustration I shall assume that this interval is 16⅔ milliseconds, with the result that the unit chain will complete a round trip of operation in exactly 100 milliseconds. Based on this assumption, the picking up of each progressive relay of the multiple chain represents a period of 100 milliseconds, and it follows that provision is made for counting up to 500 milliseconds by the picking up of the M relays after which, of course, another 100 milliseconds may be counted by permitting another round trip of the unit chain, making a total of 600 milliseconds.

The relays of the unit and multiple chains each operate a plurality of contacts as will be seen from an inspection of the drawings.

It will be obvious that with the time measuring means TMM controlled in this manner, the particular relays of the unit and multiple chains which are picked up at any one time are a measure of the time that any section which is then functioning as a measuring section has been occupied. It will also be obvious that since the sections have a known fixed length, the speed of a car passing through the car retarder can be determined from the time during which a section is occupied by a pair of wheels. It follows, therefore, that the relays of the counting chains which are picked up when a pair of wheels vacates a section which is then functioning as a measuring section serve as a measure of the average car speed while the car is traversing a length equal to the lengths of the measuring sections. For example, assuming that the track sections T are all 3 ft. 1½ in. long, and that the relays of the unit and multiple chains operate at the time intervals designated above, if a track section remains occupied for 266 milliseconds, which is the time it will remain occupied with an average car speed of 8 miles per hour, when the section becomes vacated, relays 2M and 4U will be picked up, and it follows that if these relays are picked up when a measuring section becomes vacated, it is an indication that the car which caused them to pick up was traveling at an average speed of 8 miles per hour. Similarly, if a track section which is serving as a measuring section is occupied for 600 milliseconds, which corresponds to a car speed of 3.1 miles per hour, relays 5M and 6U will be picked up to indicate that the car speed is 3.6 miles per hour. The car speeds corresponding to various relay combinations are shown in tabular form in Fig. 2, and by reference to this table the car speed for any particular relay combination can be determined.

The weight responsive apparatus referred to hereinbefore for controlling the relays IP, IPO and LP comprises a weight responsive contactor WRC arranged to be operated by cars passing through the retarder. This contactor may assume a variety of different constructions. For example, it may comprise a scale which weighs the cars and which selectively operates contacts in accordance with the car weight provided the car weight exceeds a predetermined minimum weight. Alternatively this contactor may comprise a circuit controller operated by the deflection of one of the track rails to cause it to selectively close its contacts in accordance with the car weight provided the weight of the car which caused the rail deflection exceeds a predetermined minimum weight. As shown in the drawings, this contactor comprises a movable contact member 250 biased to an upper position by means of a spring 251, and operatively connected with the rail 1a opposite to the track section IT in such manner that when the section IT is occupied by a car, the spring will deflect and will permit the contact member to move downwardly an amount which is proportional to the car weight. The movable contact 250 cooperates with four stationary contact members 252, 253, 254 and 255 in such manner that as it moves downwardly, it will constantly engage the member 252 and will selectively engage the contact members 253, 254 and 255 to close a contact 252—250—253, 252—250—254 or 252—250—255 depending upon the extent of the downward movement. By properly proportioning the parts, the contacts may be made to become closed at any desired car weights, which for purposes of illustration I shall assume to be 35 tons for the contact 252—250—253, 50 tons for the contact 252—250—254 and 70 tons for the contact 252—250—255.

The contactor WRC together with the track relays TR control a plurality of weight responsive relays WR35, WR50 and WR70. Relay WR35 is provided with a pick-up circuit which passes from terminal B of a suitable source of current not shown in the drawings through wire 260, contact 252—250—253 of weight responsive contactor WRC, wire 261, the winding of relay WR35, back contact 262 of relay WR50 and back contact 263 of relay WR70 to terminal C of the source. Relay WR35 is also provided with a plurality of stick circuits each of which passes from terminal B through a front contact 264 of a different one of the track relays ITR to 6TR, inclusive, front contact 265 of relay WR35, the winding of relay WR35, back contact 262 of relay WR50 and back contact 263 of relay WR70 to terminal C.

Relay WR50 is provided with a pick-up circuit which passes from terminal B through wire 260, contact 252—250—254 of weight responsive contactor WRC, wire 266, the winding of relay WR50 and back contact 263 of relay WR70 to terminal C. Relay WR50 is also provided with a plurality of stick circuits each of which passes from terminal B through a front contact 264 of a different one of the track relays TR, front contact 267 of relay WR50, the winding of relay WR50 and front contact 263 of relay WR70 to terminal C.

Relay WR70 is provided with a pick-up circuit which passes from terminal B through wire 260, contact 252—250—255 of weight responsive contactor WRC, wire 268 and the winding of relay WR70 to terminal C. Relay WR70 is further provided with a plurality of stick circuits each of which passes from terminal B through a front contact 264 of a different one of the track relays TR, front contact 269 of relay WR70 and the winding of relay WR70 to terminal C.

With the weight responsive relays controlled in this manner, it will be apparent that when a car enters the retarder if the car weighs less than 35 tons, none of the contacts of the weight responsive contactor WRC will become closed and all of the weight responsive relays will remain deenergized. If, however, a car which weighs more than 35 tons, but less than 50 tons enters the retarder, contact 252—250—253 will become closed and will complete the pick-up circuit for relay WR35, thereby causing this relay to become energized. As soon as this relay becomes energized, one of its stick circuits will become closed at its front contact 255, and as the car moves through the retarder, other ones of its stick circuits will become closed, with the result that this relay will subsequently remain energized until the car leaves the retarder.

In a similar manner, if a car weighing more than 50 tons but less than 70 tons enters the retarder, the pick-up circuits for both of the relays WR35 and WR50 will become closed. This will cause both of these relays to pick up, but as soon as relay WR70 picks up it will interrupt at its back contact 262 the pick-up circuit and all of the stick circuits for relay WR35, and this latter relay will therefore immediately release. When relay WR50 once picks up, it will subsequently remain picked up, by virtue of its stick circuits, until the car which caused it to pick up leaves the retarder.

When a car weighing more than 70 tons enters the retarder, the pick-up circuits for all three relays WR35, WR50 and WR70 will become successively closed, and all three of these relays will become energized. Relays WR35 and WR50, however, will immediately become deenergized since as soon as relay WR70 picks up, all circuits for these relays will be interrupted at back contact 263 of relay WR70. When relay WR70 becomes energized, it will of course remain energized by virtue of its stick circuits until the car which caused it to become energized leaves the retarder as is obvious.

The weight responsive relays WR35, WR50 and WR70, and the relays of the unit and multiple counting chains together control a plurality of pick-up circuits for each of the pressure control relays IP and IPO. As will appear presently, the relay IP functions when it becomes energized to reduce the braking pressure exerted by the retarder, while the relay IPO is effective when it becomes energized to fully release the retarder. The pick-up circuits for the relays IP and IPO are preferably so arranged that for each car speed at which relay IPO is caused to pick up, the relay IP will be caused to pick up at a slightly higher car speed, whereby an automatic stepped reduction in the pressure of the fluid supplied to motor M is obtained prior to actually releasing the retarder. The number of control speeds that are provided for any particular yard installation will depend upon the variety of the weights of the cars which are to be retarded, it being in general desirable that the speed at which heavy cars are permitted to leave the retarder should be less than the speed at which lighter cars are permitted to leave the retarder since the car resistance of light cars is greater than that of heavy cars. As here illustrated, three pick-up circuits have been provided for each of the relays IP and IPO to enable three different leaving or control speeds to be obtained, one for light cars, that is, cars weighing less than 35 tons, one for medium weight cars, that is, cars weighing between 35 and 70 tons, and one for heavy cars, that is, cars weighing more than 70 tons. The actual car speeds at which these circuits become closed will depend of course upon the particular contact combinations of the U and M relays which are included in these circuits, and may be varied to suit the conditions of grade, length of classification tracks, direction and velocity of the prevailing winds, general temperature conditions, etc., encountered in any particular yard layout to which the system is applied. As here illustrated, these circuits are so arranged that when a light weight car is being retarded, the relays IP and IPO will pick up when the car speed has been reduced to 11.6 and 6.7 miles per hour, respectively; when a medium weight car is being retarded, the relays IP and IPO will pick up at speeds of 9.8 and 5.8 miles per hour, respectively; and when a heavy car is being retarded, the relays IP and IPO will pick up at speeds of 9.1 and 4 miles per hour, respectively.

Included in the pick-up circuits for the relays IP and IPO are stick relays ISP and ISPO the functions of which will be made clear presently.

To facilitate connecting the desired contact combinations of the U and M relays of the unit and multiple counting chains in the pick-up circuits for the IP and IPO relays to obtain the desired control speeds each of the contacts of the U and M relays are permanently connected to a different pair of terminal posts mounted on a terminal board TB (Fig. 1b). This terminal board is also provided with other terminal posts such as the terminal posts 81 and 83 to which jumpers, such as the jumpers 119 and 150, may be attached, and which are permanently connected in the pick-up circuits.

Considering now the pick-up circuits for the relays IP and IPO in detail, the pick-up circuit which is effective for controlling relay IP when a light weight car is being retarded by the retarder passes from terminal B of a suitable source of current through contact 27 of lever L, wire 275, a back contact 276—276b of each of the weight responsive relays WR35, WR50 and WR70, wire 277, terminal post 81, jumper 119, front contact 75 of relay 5U, jumper 120, front contact 78 of relay IM, jumper 121, terminal post 93, a resistor 219 and the winding of relay IP in series connected in multiple with a resistor 220 and a condenser 221 in series, and the winding of relay ISP to terminal C of the source.

The pick-up circuit which is effective for controlling relay IPO when a light weight car is being retarded by the retarder, passes from terminal B through contact 27 of lever L, a back contact 276—276b of each of the weight responsive relays WR35, WR50 and WR70, terminal post 83, jumper 150, front contact 77 of relay 1U, jumper 151, front contact 80 of relay 3M, jumper 152, terminal post 99, a resistance 222 and the winding of relay 1PO in series connected in multiple with a resistor 223 and a condenser 224 in series, and the winding of relay 1SPO to terminal C.

The pick-up circuit which is effective for controlling relay 1P when a medium weight car is being retarded by the retarder passes from terminal B through contact 27 of lever L, wire 275, front contact 276—276a of relay WR35 or back contact 276—276b of relay WR35 and front contact 276—276a of relay WR50, wire 278, terminal post 84, jumper 163, front contact 75 of relay 1U, jumper 164, front contact 78 of relay 2M, jumper 165, terminal post 94, resistor 219 and the winding of relay 1P in series connected in multiple with resistor 220 and condenser 221 in series, and the winding of relay 1SP to terminal C.

The pick-up circuit which is effective for controlling relay 1PO when a medium weight car is being retarded by the retarder passes from terminal B through contact 27 of lever L, wire 275, front contact 276—276a of relay WR35 or back contact 276—276b of relay WR35 and front contact 276—276a of relay WR50, wire 278, terminal post 86, jumper 168, front contact 80 of relay 4M, jumper 169, terminal post 100, resistor 222 and the winding of relay 1PO in series connected in multiple with resistor 223 and condenser 224 in series, and the winding of relay 1SPO to terminal C.

The pick-up circuit which is effective for controlling relay 1P when a heavy car is being retarded by the retarder passes from terminal B through contact 27 of lever L, wire 275, back contact 276—276b of relay WR35, back contact 276—276b of relay WR50, front contact 276—276a of relay WR70, wire 279, terminal post 87, jumper 173, front contact 76 of relay 2U, jumper 174, front contact 89 of relay 2M, jumper 175, terminal post 95, resistor 219 and the winding of relay 1P in series connected in multiple with resistor 220 and condenser 221 in series, and the winding of relay 1SP to terminal C.

The pick-up circuit which is effective for controlling relay 1PO when a heavy car is being retarded by the retarder passes from terminal B through contact 27 of lever L, wire 275, back contact 276—276b of relay WR35, back contact 276—276b of relay WR50, front contact 276—276a of relay WR70, wire 279, terminal post 89, jumper 105, front contact 77 of relay 2U, jumper 106, front contact 80 of relay 5M, jumper 107, terminal post 101, resistor 222 in series with the winding of relay 1PO connected in multiple with resistor 223 in series with condenser 224, and the winding of relay 1SPO to terminal C.

It will be noted that each of the pick-up circuits just described for both the 1P and 1PO relays includes contact 27 of lever L, and it follows, therefore, that these circuits are effective to control these relays when and only when lever L occupies its p1 position.

It will also be noted that since relay 1SP is included in each of the pick-up circuits for relay 1P, relay 1SP will become energized whenever relay 1P becomes energized. Likewise, since relay 1SPO is included in each of the pick-up circuits for relay 1PO, relay 1SPO will become energized whenever relay 1PO becomes energized.

Relay 1P is also provided with a plurality of stick circuits each of which includes a front contact 215 of a different one of the relays 1U to 6U of the unit chain, wire 216, back contact 217—217a or relay 1SPO, wire 231, front contact 130 of relay 1SP, front contact 218 of relay 1P, resistor 219 in series with the winding of relay 1P connected in multiple with resistor 220 in series with condenser 221, and the winding of relay 1SP to terminal C. It will be apparent, therefore, that when relay 1P becomes energized by virtue of the completion of any one of its pick-up circuits, it will subsequently be held energized over one of its stick circuits as long as the track circuit the occupancy of which caused it to become energized remains occupied, provided that relay 1SPO remains deenergized.

Relay 1PO is also provided with a plurality of stick circuits each of which includes a front contact 215 of a different one of the relays U of the unit chain of counting relays, wire 216, front contact 217—217b of relay 1SPO, front contact 218 of relay 1PO, resistor 222 in series with the winding of relay 1PO connected in multiple with resistor 223 in series with condenser 224, and the winding of relay 1SPO to terminal C. It follows that when relay 1PO becomes energized by virtue of the completion of any one of its pick-up circuits, it will subsequently be held energized by virtue of one of its stick circuits as long as the track circuit the occupancy of which caused it to become energized remains occupied.

It will be remembered that a new speed measurement is made each time the leading pair of wheels of a car passes from one track section to another, and it is obvious that each time a new speed measurement is made a time interval will elapse during which all of the pick-up and stick circuits for the relays 1P and 1PO will be open. To obtain smooth operation of the retarder it is necessary that when either one of the relays 1P or 1PO becomes energized, it should subsequently remain energized as long as successive speed measurements indicate that the car speed has not changed and it is therefore necessary that the relays 1P and 1PO should be sufficiently slow releasing to bridge the interval between successive speed determinations. As here shown, these relays are rendered sufficiently slow releasing to bridge this interval by storing energy in the condensers 221 and 224 which are shunted around the relays 1P and 1PO in series with the associated resistors. Condensers are used because they guarantee a definite time element in a shorter space of time than is possible with schemes utilizing the saturation of the relay to obtain the time element.

The stick relays 1SP and 1SPO are provided to prevent the relays 1P and 1PO from starting their slow releasing period at the time of their pick-up instead of waiting until the track section the occupancy of which caused them to pick up is vacated. Thus, it will be seen that the relays 1SP and 1SPO on each successive speed measurement serve to maintain energy on the associated pressure control relay 1P or 1PO from the time such relay becomes energized until such time as the next track relay becomes energized, at which time the resultant deenergization of all of the relays of the unit chain will interrupt the stick circuits for these pressure control relays and will thereby permit the condenser associated with the energized pressure control relay to function to delay the release of the relay until a new speed measurement is completed.

The relay LP is provided with an energizing circuit which passes from terminal B through contact 29 of lever L, wires 281 and 282, a back contact 280 of each of the relays WR50 and WR70, wire 210 and the winding of relay LP to terminal C. It will be seen, therefore, that whenever lever L is moved to its p1 or p2 position, relay LP will become energized and will subsequently remain energized until either one of the weight responsive relays WR50 or WR70 picks up. That is to say, when lever L occupies its p1 or p2 position, relay LP will be energized at all times when cars weighing less than 50 tons are traversing the retarder, and will be deenergized when cars in excess of 50 tons are traversing the retarder. The actual car weight just mentioned above which relay LP will release is of course arbitrary, and can be varied to suit conditions by providing for the control of this relay weight responsive relays which will pick up at the desired car weights if such relays are not already available.

As shown in the drawings, all parts occupy the positions which they normally occupy when no car is passing through the retarder, that is to say, all relays are deenergized, lever L occupies its p0 or "off" position, and valve V2 is deenergized. Valve V1, however, is energized over a circuit which may be traced from terminal B of the source through contact 25 of lever L, line wire 115, wire 203, and the winding of valve V1 to terminal C. As was pointed out hereinbefore, when valve V2 is deenergized and valve V1 is energized, cylinder 4 of motor M is disconnected from the source of fluid pressure and is connected with atmosphere, and the braking bars are therefore held in their ineffective or non-braking positions by the spring 10. The contact 22a of each of the pressure responsive devices P is closed, and the contact 22—22b of each of these devices is open.

In explaining the operation of the apparatus as a whole, I shall assume that a car which weighs less than 35 tons is approaching the retarder, and that the operator wishing to cause this car to leave the retarder when it has been slowed down to the proper control speed moves lever L from its p0 or "off" position to its p1 or "normal" control position. The movement of lever L from its p0 to its p1 position will interrupt at its contact 25 the circuit which was previously closed for valve V1, and will complete at its contact 29 a circuit for valve V2 which circuit may be traced from terminal B through contact 29 of lever L, wires 281 and 235, back contact 236—236a of relay IPO, back contact 237—237a of relay IP, back contact 238—238a of relay LP, wire 205 and the winding of valve V2 to terminal C. Valve V1 will therefore become deenergized and will disconnect cylinder 4 of motor M from atmosphere, and valve V2 will become energized and will connect cylinder 4 with pipe 17, thereby admitting fluid to cylinder 4 at full line pressure. The movement of lever L from its p0 to its p1 position also completes at its contact 29 the previously traced circuit for relay LP and this relay therefore immediately picks up. As soon as this relay picks up, it interrupts at its back contact 238—238a the circuit just traced for valve V2, and completes at its front contact 238—238b another circuit for valve V2 which latter circuit may be traced from terminal B through contact 29 of lever L, wires 281 and 235, back contact 236—236a of relay IPO, back contact 237—237a of relay IP, front contact 238—238b of relay LP, wire 239, contact 22—22a of pressure responsive device P45—55, wire 205 and the winding of valve V2 to terminal C. By virtue of this latter circuit valve V2 will remain energized until the pressure of the fluid in motor M increases to 45 pounds per square inch at which time contact 22—22a of pressure responsive device P45—55 will open and will deenergize valve V2. If the pressure of the fluid in motor M now increases to 55 pounds per square inch for any reason, contact 22—22b of pressure responsive device P45—55 will become closed and will complete a circuit for valve V1 passing from terminal B through contact 29 of lever L, wires 281 and 235, back contact 236—236a of relay IPO, back contact 237—237a of relay IP, front contact 238—238b of relay LP, wire 239, contact 22—22b of pressure responsive device P45—55, asymmetric unit 206 in its low resistance direction, and the winding of valve V1 to terminal C. Valve V1 will therefore become energized and will vent fluid from motor M until the pressure decreases to 55 pounds at which time contact 22—22b of pressure responsive device P45—55 will open and will deenergize valve V1.

When the first axle of the car enters track section 1T, track relay 1TR will pick up and will set into operation the speed responsive apparatus, which thereupon will start to function to measure the speed of the car. Furthermore, the entry of the first axle of the car into section 1T will operate the weight responsive contact WRC, but since the car weighs less than 35 tons none of the contacts of this contactor will become closed, and all of the weight responsive relays will therefore remain deenergized. The car retarder will of course now start to slow down the car and if the car speed drops below 11.6 miles per hour which is the speed at which the relays 5U and 1M become picked up, the previously described pick-up circuit for relay 1P will become closed, and relays 1P and 1SP will become picked up. The picking up of these relays will complete the previously traced stick circuit for these relays, and these relays will therefore now remain energized until relay 1PO picks up or until section 1T becomes vacated even though the relays 5U and 1M of the speed responsive apparatus subsequently release.

The picking up of relay 1P will also interrupt at its back contact 237—237a all circuits previously traced for valves V1 and V2 and will complete at its front contact 237—237b another circuit for valve V1 passing from terminal B through contact 29 of lever L, wires 281 and 235, back contact 236—236a of relay 1PO, front contact 237—237b of relay 1P, front contact 240—240b of relay LP, wire 241, contact 22—22b of pressure responsive device P20—30, asymmetric unit 206 in its low resistance direction, and the winding of valve V1 to terminal C. Valve V1 will therefore become energized and will vent motor M to atmosphere. Valve V1 will continue to vent motor M to atmosphere until the pressure in the cylinder 4 decreases to 30 pounds per square inch, at which time contact 22—22b of pressure responsive device P20—30 will open and will deenergize valve V1. If the pressure in cylinder 4 now decreases below 20 pounds per square inch, the resultant closing of contact 22—22a of pressure responsive device P20—30 will complete another circuit for valve V2, and current will flow from terminal B through contact 29 of lever L, wires 281 and 235, back contact 236—236a of relay 1PO, front contact 237—237b of relay 1P, front contact 240—240b of relay LP, wire 241, contact 22—22a of pressure responsive device P20—30, wire 205, and the winding 14 of valve V2 to terminal C. Valve V2 will therefore become energized and will connect motor M with pipe 17 until the pressure increases to 20 pounds per square inch at which time contact 22—22b of pressure responsive device P20—30 will open and will deenergize valve V2. It will be seen, therefore, that when relay IP becomes energized with relay LP energized, it functions to reduce the pressure of the fluid in motor M from a pressure of between 45 and 55 pounds per square inch to a pressure of between 20 and 30 pounds per square inch.

If the speed of the car drops below 6.7 miles per hour while the leading pair of wheels is traversing section 1TR, thereby causing relays 1U and 3M of the unit and multiple chains of the speed responsive apparatus to both become picked up, the previously traced circuit for relay IPO including front contact 77 of relay 1U and front contact 80 of relay 3M will become closed, and relays IPO and 1SPO will become picked up. When these relays become picked up, one of the previously traced stick circuits for these relays will become closed, and all of the stick circuits for the relays IP and ISP will become opened. The closing of the stick circuit for relays IPO and 1SPO will cause these relays to remain energized until section 1TR next becomes vacated, while the opening of the stick circuit for relays IP and 1SP will cause these relays to release.

The picking up of relay IPO further interrupts all circuits previously traced for valves V1 and V2 and completes a circuit for valve V1 passing from terminal B through contact 29 of lever L, wires 281 and 235, front contact 236—236b of relay IPO, wire 203 and the winding 14 of valve V1 to terminal C. Valve V2 if it is not already deenergized when this circuit becomes closed will become deenergized, and valve V1 will become energized to thereby again vent fluid from motor M to thereby effect the release of the retarder. With the retarder released, no further retardation of the car will take place.

I shall now assume that with lever L in its p1 position and with relay IP energized the leading pair of wheels of the car passes out of section 1TR and into section 2TR. When this happens, a new timing period will be initiated which will cause all of the relays of the unit and multiple chains to release, and the releasing of these relays, in turn, will interrupt the stick circuit which was previously closed for relays IP and 1SP at front contact 215 of relay 5U. Relay IP will therefore become deenergized, but due to the condenser 221 and resistor 220 associated with this relay this relay will not release for a sufficient interval of time to permit a new speed measurement to be made. When this speed measurement has been made if the speed of the car is still below the speed at which relay IP picks up but above the speed at which relay IPO picks up relay IP will again pick up, and the retarder will continue to retard the car with a braking force corresponding to a pressure of between 20 and 30 pounds per square inch in cylinder M.

If lever L remains in its p1 position and the speed of the car remains less than 11.6 miles per hour but more than 6.1 miles per hour, a similar operation will take place each time the leading pair of wheels enters a new track section.

If the car speeds up between speed measurements, when the next speed measurement is made relay IP will release, which will automatically increase the braking pressure. Likewise, if the car slows down sufficiently between speed measurements, when the next speed measurement is completed relay IPO will pick up and will release the retarder.

If relay IPO is energized when the leading pair of wheels of the car passes from one track section to the next, this relay will become deenergized but will not release due to the slow releasing characteristics imparted to it by the condenser 224 and associated resistances, until a sufficient time interval has elapsed to enable a new speed determination to be made. If the car speed has not increased above 6.1 miles per hour by the time the new speed measurement is completed, relay IPO will become reenergized, and if the car speed has increased above 6.1 miles per hour, relay IP will become deenergized to thereby reapply the retarder.

When the leading pair of wheels vacates section 6T, the pair of wheels next in rear will then function to operate the speed responsive apparatus in a manner which is fully described in the hereinbefore referred to Snavely application, Serial No. 424,338.

It follows, therefore, that when a car weighing less than 35 tons proceeds through the retarder, the speed responsive apparatus will function to automatically decrease the braking pressure when the speed of the car decreases below 11.6 miles per hour, and will automatically release the retarder when the speed decreases to the control speed of 6.1 miles per hour. Likewise, after the desired control speed has been reached, the apparatus will then function to reapply and rerelease the retarder if necessary to maintain this control speed.

When lever L occupies its p1 position and a car weighing more than 35 but less than 50 tons passes through the retarder, the relay WR35 will pick up and will thereby cause the relays IP and IPO to be controlled by the pick-up circuits previously traced including front contact 276—276a of relay WR35, so that under these conditions relay IP will pick up and will decrease the braking force exerted by the retarder when the car speed has decreased below 9.8 miles per hour, and relay IPO will pick up and release the retarder when the car speed decreases below 5.3 miles per hour. Except for the fact that a different set of pick-up circuits is effective for controlling the relays IP and IPO under these conditions, the operation is otherwise the same as that described above, and it is believed to be unnecessary therefore to describe this operation in detail.

If a car weighing more than 50 tons but less than 70 tons passes through the retarder when lever L occupies its p1 position, the resulting picking up of relay WR50 will render the same set of pick-up circuits effective for controlling relays IP and IPO as are effective when a car weighing more than 35 tons but less than 50 tons passes through the retarder, but under these conditions, the opening of back contact 280 of relay WR will cause relay LP to become deenergized. As a result as long as the speed of the car is sufficiently high so that relays IP and IPO are both deenergized, valve V2 will become energized over the circuit first traced for this valve, and will thereby cause motor M to be supplied with fluid at full line pressure.

When the speed of the car decreases below the speed at which relay IP picks up, the resulting picking up of this relay will interrupt the circuit for valve V2, and will complete a circuit for valve V1 passing from terminal B through contact 29 of lever L, wires 281 and 235, back contact 236—236a of relay IPO, front contact 237—237b of relay IP, back contact 240—240b of relay LP, wire 239, contact 22—22b of pressure responsive device P45—55, asymmetric unit 206 in its low resistance direction, and the winding 14 of valve V1 to terminal C. Valve V1 will therefore become energized and will vent fluid from motor M until the pressure decreases to 55 pounds per square inch. When this happens contact 22—22b of pressure responsive device P45—55 will open and will deenergize valve V1. If the pressure in motor M now decreases below 45 pounds per square inch, valve V2 will again become energized over a circuit which passes from terminal B through contact 29 of lever L, wires 281 and 235, back contact 236—236a of relay IPO, front contact 237—237b of relay IP, back contact 240—240b of relay LP, wire 239, contact 22—22a of pressure responsive device P45—55, wire 205, and the winding of valve V2 to terminal C.

If the speed of the car decreases below 5.3 miles per hour, so that relay IPO picks up, valve V1 will become energized and will vent fluid from motor M to release the retarder in the same manner as when a light weight car traverses the retarder.

It will be seen, therefore, that when lever L occupies its p1 position and a car weighing more than 50 but less than 70 tons traverse the retarder, the motor M will be supplied with fluid at full line pressure as long as the speed of the car is above the speed of 9.8 miles per hour which is the speed at which relay IP picks up under these conditions, and that when the car speed drops below this speed, the picking up of relay IP will function to reduce the pressure of the fluid supplied to motor M to a pressure of between 45 and 55 pounds per square inch. Furthermore, when the car speed decreases below 5.3 miles per hour, relay IPO will pick up and will release the retarder.

When lever L occupies its p1 position and a car in excess of 70 tons traverses the retarder, the operation of the apparatus will be the same as for a car weighing more than 50 but less than 70 tons except for the fact that under these conditions relay WR70 will pick up and will render still a different set of pick-up circuits effective for controlling relays IP and IPO. These pick-up circuits were traced hereinbefore, and function to cause relay IP to pick up and decrease the braking force exerted by the retarder when the car speed decreases below 9.1 miles per hour, and relay IPO to pick up and release the retarder when the car speed decreases below 4.0 miles per hour. It will be noted that under these conditions relay LP is caused to release by virtue of the opening of contact 280 of relay WR70.

When lever L is moved to its p3 position, the speed responsive and weight responsive apparatus is rendered ineffective to control the relays IP and IPO so that these relays both remain deenergized. Relay LP, however, is still controlled by the weight responsive relays WR50 and WR70 so that relay LP will be picked up when cars weighing less than 50 tons traverse the retarder and will be released when heavier cars traverse the retarder. With relays IP and IPO deenergized, when relay LP is released, valve V2 will remain constantly energized by virtue of the previously traced circuit for this valve, so that motor M will be supplied with fluid at full line pressure. When relay LP is picked up, however, the pressure responsive device P45—55 will then be rendered effective to control the valves V1 and V2, and motor M will therefore be supplied with fluid at a pressure of between 45 and 55 pounds per square inch.

One advantage of apparatus embodying my invention is that since each car can be made to leave the retarder at the most desirable speed for the particular car weight, all elements of control of the retarder requiring skill in judging car speed, etc., are eliminated, whereby the car retarder yard as a whole can be worked at the highest efficiency without the necessity for specially trained operators.

Moreover, since the most desirable coupling speeds are obtained due to the combination of speed and weight control, there is less likelihood of damage to cars and their contents caused by excess coupling speeds when the cars reach their destination in the classification tracks.

Another advantage of apparatus embodying my invention is that it is very flexible, and readily lends itself to varying yard conditions.

Although I have herein shown and described only one form of railway braking apparatus embodying my invention, it is understood that various changes and modifications may be made therein within the scope of the appended claims without departing from the spirit and scope of my invention.

Having thus described my invention, what I claim is:

1. In combination, a car retarder, means controlled by the weight of a car passing through the retarder for controlling the braking force exerted by the retarder to cause the retarder to exert a higher braking force for heavy cars than it exerts for light cars, means controlled by the speed of a car passing through the retarder for decreasing the braking force exerted by the retarder as the car speed approaches any one of a plurality of selected control speeds and for releasing the retarder if the car speed decreases to the selected speed, and means automatically controlled by the weight of a car passing through the retarder for automatically selecting the control speed to cause cars to leave the retarder at speeds which are inversely proportional to the car weight.

2. In combination, a car retarder, means for weighing cars passing through the retarder, means for repeatedly measuring the speed of cars passing through the retarder, and means controlled jointly by said weighing and speed measuring means for controlling the braking action of said retarder to cause cars to leave the retarder at selected control speeds which are inversely proportional to the car weights.

3. In combination, a fluid pressure operated car retarder, means controlled by the weight of a car passing through said retarder for supplying said retarder with fluid at a pressure which is proportional to the car weight, and means controlled jointly by the weight and speed of a car passing through said retarder for decreasing the pressure of the fluid supplied to said car retarder in selected amounts as the car speed decreases to cause cars to leave the retarder at speeds which are inversely proportional to the car weights.

4. In combination, a fluid pressure operated car retarder, means controlled by the weight of a car passing through said retarder for supplying said retarder with fluid at a pressure which is proportional to the car weight, and means controlled jointly by the weight and speed of a car passing through said retarder for decreasing the pressure of the fluid supplied to said car retarder when the car speed has decreased to a selected speed which depends upon and is inversely proportional to the car weight.

5. In combination, a fluid pressure operated car retarder, means controlled by the weight of a car entering the retarder for initially supplying the retarder with fluid at a pressure which depends upon the car weight, and means for subsequently reducing the pressure of the fluid supplied to said retarder when the speed of the car has decreased to a speed which is inversely proportional to the car weight.

6. In combination, a car retarder, means controlled by the weight of a car entering the retarder for causing said car retarder to exert a predetermined braking force which depends upon the car weight and which is greater for heavy cars than for light cars, and means controlled by the weight and speed of the car for subsequently reducing said braking force when the car speed has been reduced to a speed which depends upon the car weight and which is inversely proportional to the car weight.

7. In combination, a car retarder, means for causing said car retarder to exert a plurality of different braking forces, means automatically controlled by the weight of a car entering the retarder for initially selecting the level of the braking force, and means controlled by the speed of the car for subsequently decreasing the braking force if the speed of the car decreases below a first speed and for releasing the retarder if it decreases below a second speed.

8. In combination, a stretch of railway track, fluid pressure operated braking apparatus for retarding the speed of a car traversing said stretch, means for supplying said apparatus with fluid at a selected one of a plurality of predetermined pressures, said selection being effected automatically in accordance with the weight of the car, means controlled by the speed of the car for subsequently reducing the pressure if the car speed decreases below one of a plurality of predetermined speeds, and means for selecting such predetermined speed automatically in inverse proportion to the car weight.

9. In combination, a car retarder, a plurality of relays, means for selectively energizing said relays in accordance with the weight of a car entering said retarder, and means for releasing said retarder at a plurality of different speeds depending upon which one of said relays becomes energized.

10. In combination, a car retarder, a first, a second, and a third relay, means for causing said car retarder to exert a first braking force when all three of said relays are deenergized, means for decreasing said braking force a first amount if said first relay becomes energized when said second relay is deenergized and a second amount if said first relay becomes energized when said second relay is also energized, means for releasing said retarder when said third relay becomes energized, means for energizing said second relay when cars weighing less than a predetermined weight are being retarded by said retarder and for deenergizing said relay when cars above said predetermined weight are being retarded by said retarder, means for energizing said first relay when the speed of a car traversing said retarder decreases below a first predetermined speed, and other means for energizing said third relay when the speed of a car traversing said retarder decreases below a second predetermined speed.

11. In combination, a car retarder, a first, a second, and a third relay, means for causing said car retarder to exert a first braking force when all three of said relays are deenergized, means for decreasing said braking force a first amount if said first relay becomes energized when said second relay is deenergized and a second amount if said first relay becomes energized when said second relay is also energized, means for releasing said retarder when said third relay becomes energized, speed responsive apparatus including a plurality of relays which pick up selectively in response to the speed of a car being retarded by said retarder, a plurality of other relays which pick up selectively in response to the weight of a car being retarded by said retarder, and means controlled jointly by the relays of said speed responsive apparatus and said weight responsive relays for selectively controlling said first and third relays, and other means controlled by said weight responsive relays for controlling said second relay.

12. In combination, a car retarder, a first, a second, and a third relay, means for causing said car retarder to exert a first braking force when all three of said relays are deenergized, means for decreasing said braking force a first amount if said first relay becomes energized when said second relay is deenergized and a second amount if said first relay becomes energized when said second relay is also energized, means for releasing said retarder when said third relay becomes energized, speed responsive apparatus including a plurality of relays which pick up selectively in response to the speed of a car being retarded by said retarder, a plurality of other relays which pick up selectively in response to the weight of a car being retarded by said retarder, means controlled jointly by the relays of said speed responsive apparatus and said weight responsive relays for selectively controlling said first and third relays in such manner that said first relay will pick up when the speed of a car being retarded by the car decreases to one of a plurality of predetermined speeds which depends upon the car weight and that said third relay will pick up when the speed of a car decreases to one of a plurality of predetermined speeds each of which also depends upon the car weight and each of which for any given car weight is less than the speed at which said first relay picks up, and other means controlled by said weight responsive relays for controlling said second relay.

JOHN W. LOGAN, JR.